United States Patent
Encarnacion et al.

(10) Patent No.: US 11,748,167 B2
(45) Date of Patent: Sep. 5, 2023

(54) DYNAMIC TOGGLE OF FEATURES FOR ENTERPRISE RESOURCES

(71) Applicant: Citrix Systems, Inc., Fort Lauderdale, FL (US)

(72) Inventors: Eliezer Amisadai Encarnacion, Coral Springs, FL (US); Jeremy Matthew White, Apex, NC (US)

( * ) Notice: Subject to any disclaimer, the term of this patent is extended or adjusted under 35 U.S.C. 154(b) by 0 days.

(21) Appl. No.: 17/818,422

(22) Filed: Aug. 9, 2022

(65) Prior Publication Data

US 2022/0383257 A1    Dec. 1, 2022

Related U.S. Application Data

(62) Division of application No. 16/733,654, filed on Jan. 3, 2020, now Pat. No. 11,442,783.

(51) Int. Cl.
  *G06F 9/50*   (2006.01)
  *G06F 11/32*  (2006.01)
  *G06F 11/07*  (2006.01)
  *G06Q 10/101* (2023.01)

(52) U.S. Cl.
  CPC .......... *G06F 9/505* (2013.01); *G06F 9/5044* (2013.01); *G06F 11/0769* (2013.01); *G06F 11/328* (2013.01); *G06Q 10/101* (2013.01)

(58) Field of Classification Search
  CPC ....................................................... G06F 9/505
  See application file for complete search history.

(56) References Cited

U.S. PATENT DOCUMENTS

| 5,475,844 A    | * | 12/1995 | Shiramizu ........... G06F 11/3409 713/1 |
| 10,754,696 B1  | * | 8/2020  | Chinnam ............. G06F 11/1453 |
| 2012/0221730 A1 |  | 8/2012  | Oba |
| 2018/0026912 A1 |  | 1/2018  | Guim Bernat et al. |

* cited by examiner

Primary Examiner — Charlie Sun

(57) ABSTRACT

A system, method and program product for handling potentially problematic events in an enterprise computing platform. A method is disclosed that includes: determining whether a received event includes a feature driven folder processing event; in response to a determination that the event is not a feature driven folder processing event, process the event and determine whether a file count for a folder is impacted; in response to the file count being impacted, evaluate the file count relative to a set of processing thresholds to determine which feature driven folder processing events are enabled for the folder, and to update associated metadata for the folder; and in response to a determination that the event is a feature driven folder processing event, using the computing device to check the metadata for an associated folder to determine whether a requested feature is enabled.

20 Claims, 6 Drawing Sheets

DYNAMIC TOGGLE OF FEATURES FOR ENTERPRISE RESOURCES

PRIORITY CLAIM

The divisional application claims priority to copending application Ser. No. 16/733,654 filed on Jan. 3, 2020, entitled DYNAMIC TOGGLE OF FEATURES FOR ENTERPRISE RESOURCES.

BACKGROUND OF THE DISCLOSURE

Enterprise computing platforms, which are typically deployed via cloud systems, virtual networks, servers, etc., allow users to utilize and share resources and features over a network from remote clients. Illustrative features may for example include manipulating folders and files, running reports, executing applications, etc. Requests to perform features by users are received by enterprise computing platforms as "events" which generally specify a feature to be performed on an enterprise resource.

For example, content collaboration platforms provide a comprehensive approach to creating, accessing and managing files and folders. Within such platforms, businesses are able to implement password-protected areas for files that provide shared access to specific projects, folders and files. Large amounts of data can thus be accessed and manipulated by groups of users to achieve a common business objective. Furthermore, data can be easily migrated from personal clouds and servers and/or moved around within the platform as needed by users.

BRIEF DESCRIPTION OF THE DISCLOSURE

Aspects of this disclosure provide a system, method and program product (i.e., service) for dynamically handling potentially problematic events within an enterprise computing platform.

A first aspect of the disclosure provides a method implemented with a computing device for processing events in a computing platform. The method includes receiving a request to process an event, wherein the event specifies a feature to be performed on a resource within the computing platform. The method further includes retrieving a processing threshold for the feature from a set of stored configuration settings and obtaining metadata associated with the resource, wherein the metadata indicates an attribute of the resource. Furthermore, the method includes determining whether the attribute of the resource exceeds the processing threshold. If the attribute exceeds the threshold, the feature is disable so as to prevent an error in operation of the feature due to processing of the received request.

A second aspect of the disclosure provides a computing system that includes a memory and a processor coupled to the memory and configured to process events in a computing platform according to a method. The method includes receiving a request to process an event, wherein the event specifies a feature to be performed on a resource of the computing platform. The method also provides retrieving data indicative of a threshold for the feature and obtaining metadata associated with the resource, wherein the metadata indicates at least one attribute of the resource. The method further includes determining that the at least one attribute of the resource exceeds the threshold and disabling at least one feature of the computing platform in response to the determination that the at least one attribute of the resource exceeds the threshold, so as to prevent an error in operation of the feature due to processing of the received request.

A third aspect of the disclosure provides a method, implemented by a computing device, for processing events for a content collaboration platform. The method includes determining whether a received event includes a folder processing event and in response to a determination that the event is not a folder processing event, processing the event and determining whether a file count for a folder is impacted. In response to the file count being impacted, using the computing device to evaluate the file count relative to a set of processing thresholds and to update metadata for the folder to indicated a set of folder processing features that are enabled. In response to a determination that the event is a folder processing event, using the computing device to check the metadata for an associated folder to determine that a requested folder processing feature is enabled.

A fourth aspect of the disclosure provides a computer program product stored on a computer readable medium, which when executed by a processor, processes events in a computing platform by implementing a method that includes receiving a request to process an event, wherein the event specifies a feature to be performed on a resource within the platform. The method further includes retrieving a processing threshold for the feature from a set of stored configuration settings and obtaining metadata associated with the resource, wherein the metadata indicates an attribute of the resource. The method then determines whether the attribute of the resource exceeds the processing threshold and in response to the attribute of the resource exceeding the processing threshold, not processing the event.

A fourth aspect of the disclosure provides a computing system that includes a memory and a processor. The processor is configured to process events for a content collaboration platform, including: determining that a received event includes a feature driven folder processing event; in response to a determination that the event is not a feature driven folder processing event, processing the event and determining whether a file count for a folder is impacted; in response to the file count being impacted, evaluating the file count relative to a set of processing thresholds to determine which feature driven folder processing events are enabled for the folder, and to update associated metadata for the folder; and in response to a determination that the event is a feature driven folder processing event, using the computing device to check the metadata for an associated folder to determine whether a requested feature is enabled.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

The drawings are intended to depict only typical aspects of the disclosure, and therefore should not be considered as limiting the scope of the disclosure.

DETAILED DESCRIPTION OF THE DISCLOSURE

Embodiments of the disclosure provide technical solutions for dynamically managing potentially problematic events within an enterprise computing platform. As noted, events are received from clients over a network and generally include a request to perform a feature on some enterprise resource, e.g., rename a folder, copy a file, run a report, etc. The present embodiments dynamically analyze events before they are processed to determine whether the event should be rejected due to an attribute of the enterprise resource. This thus provides a technical solution for situations where an enterprise computing platform potentially lacks the functional capabilities to adequately handle problematic events.

For instance, one of the challenges with enterprise content collaboration platforms is that customers often create or want to migrate folders with a large number of files and subfolders. In some cases, the amount of data being migrated approaches or exceeds the memory and/or computational limitations of the platform, which can result in degraded performance and inoperability of certain features, such as moving, copying, searching, browsing content, etc. When attempting to apply such features, not only can processing be frustratingly slow, but failures can occur midway through the operation and potentially corrupt customer data. Embodiments of the present disclosure address such issues by dynamically evaluating an attribute of the enterprise resource (e.g., number of files in a folder) relative to a processing threshold defined in a set of configuration parameters for the particular action (e.g., a file count limit for a folder copy action) being requested. Based on the evaluation, processing of the event can be dynamically toggled on/off to avoid a potentially undesirable result.

Figure 1:
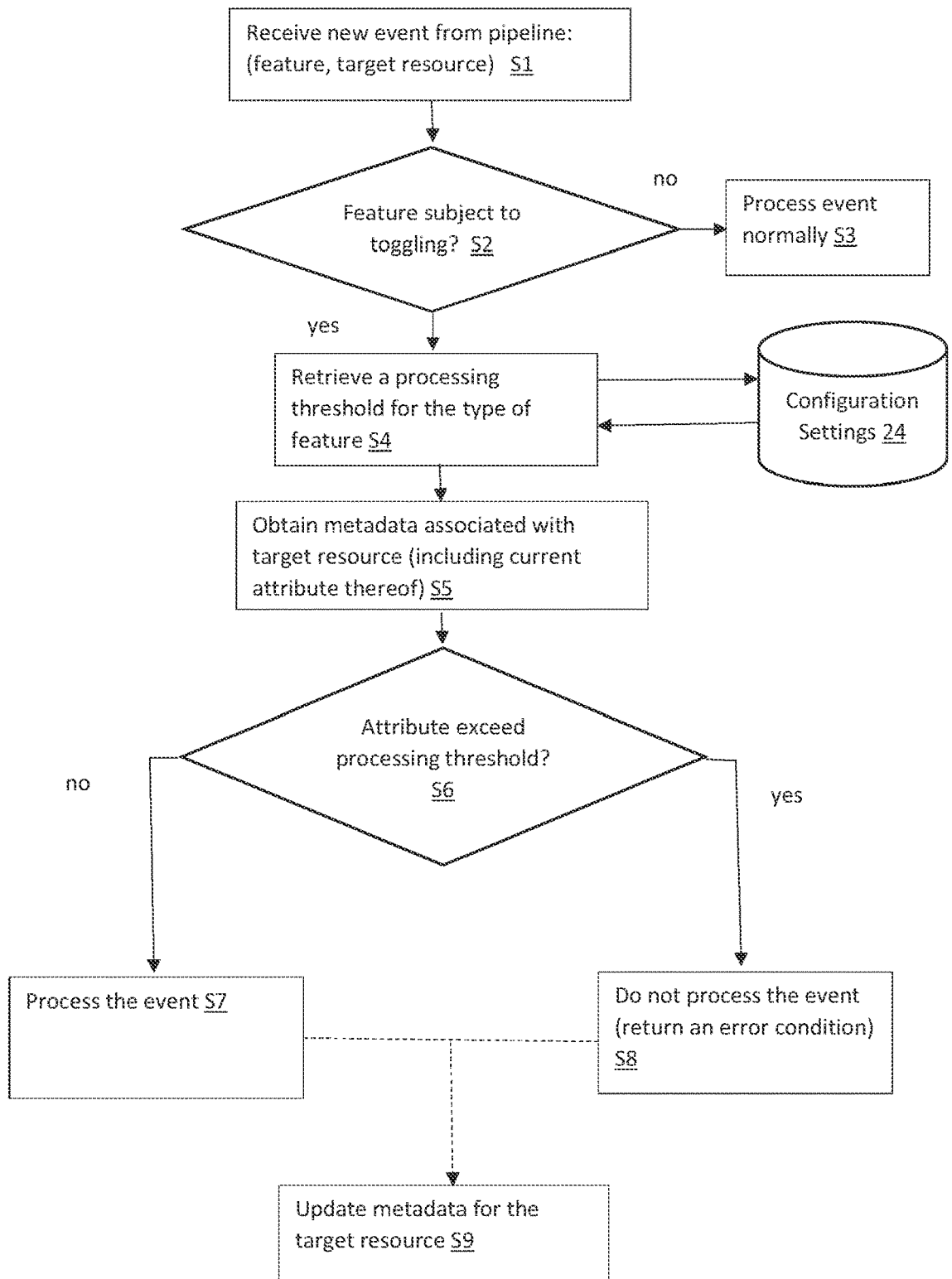
FIG. 1 depicts a flow diagram of a dynamic methodology for processing events in an enterprise computing platform, in accordance with an illustrative embodiment.

Referring to FIG. 1, a flow diagram depicts an illustrative process for implementing a dynamic toggle system for an enterprise platform. At S1, a new event is received from an event pipeline. As noted, events generally originate from a client and include a feature to be performed on an enterprise resource. For example, the event may include a request to move a folder "R&D" to a new location. At S2, a determination is made whether the feature is subject to toggling. For instance, potentially computationally intensive actions such as a "move folder" feature may be subject to toggling, whereas less computationally intensive features such as "rename file," and "delete file" are not. Using this approach, events containing features that are computationally intensive (i.e., more likely cause issues) are subject to toggling, whereas events containing features that are not computationally intensive can process normally at S3.

If the feature is subject to toggling at S2, then a processing threshold for the feature is retrieved at S4 from stored configuration settings 24, which stores a processing threshold for each feature that is subject to toggling. The processing thresholds may for example be stored in a table or database within the platform. Configuration settings 24 are initially predetermined, e.g., based on system knowledge of an administrator, and can be updated as needed, e.g., based on changing platform capabilities. For instance, if additional memory or CPU resources are allocated for the platform, the thresholds can be increased by an administrator, programmatic rule, or machine learning tool to align with the platform's capabilities. Similarly, if memory or CPU resources are decreased, the thresholds can be reduced.

In one illustrative example, the feature "move folder" may have a processing threshold that only allows the feature to be run for folders that contain fewer than 110,000 files. Other folder related features may have different thresholds. Accordingly, illustrative configuration settings for different features in a content collaboration platform may include the following:

| Feature | Processing Threshold |
| --- | --- |
| Move folder | 110,000 files/folder |
| Copy folder | 75,000 files/folder |
| Search folder | 100,000 files/folder |

At S5, metadata associated with the enterprise resource is obtained, including at least one parameter that indicates an attribute of the enterprise resource. Metadata may be stored with the resource itself (e.g., in the header information of a folder), and be obtained with a simple software routine that, e.g., requests header information from a folder. For example, metadata for the folder named "R&D" might include a number of files contained in the folder and its subfolders, e.g., <file.num>=122,456, indicating that a current attribute of the R&D folder is 122,456 files. In other cases, the attribute of the enterprise resource may include a current size, processing capabilities, prior failures, time and date information, or any other piece of information that indicates a current characteristic of the resource. Metadata may be stored within the enterprise resource itself (e.g., as part of a file folder) or at some other location that stores metadata for different resources. At S6, a determination is made whether the attribute of the enterprise resource exceeds the processing threshold for the feature. If the attribute does not exceed the processing threshold at S6, then the event is processed at S7. Otherwise the event is not processed at S8 and, e.g., an error condition may be returned to the client.

Thus, in the above example involving moving the R&D folder, a determination would be made whether the attribute of 122,456 files exceeds the threshold of 110,000 files. In this case, because the threshold is exceeded, the event "move folder R&D" would not be processed. This result may also be optionally stored in the metadata associated with the enterprise resource at S9. For instance, if the result indicated that a move folder feature was not allowed, then the result could be included in the metadata of the enterprise resource, e.g., "move folder feature not enabled." In this manner, metadata for different resources could indicate features that are currently enabled and/or not enabled.

Figure 2:
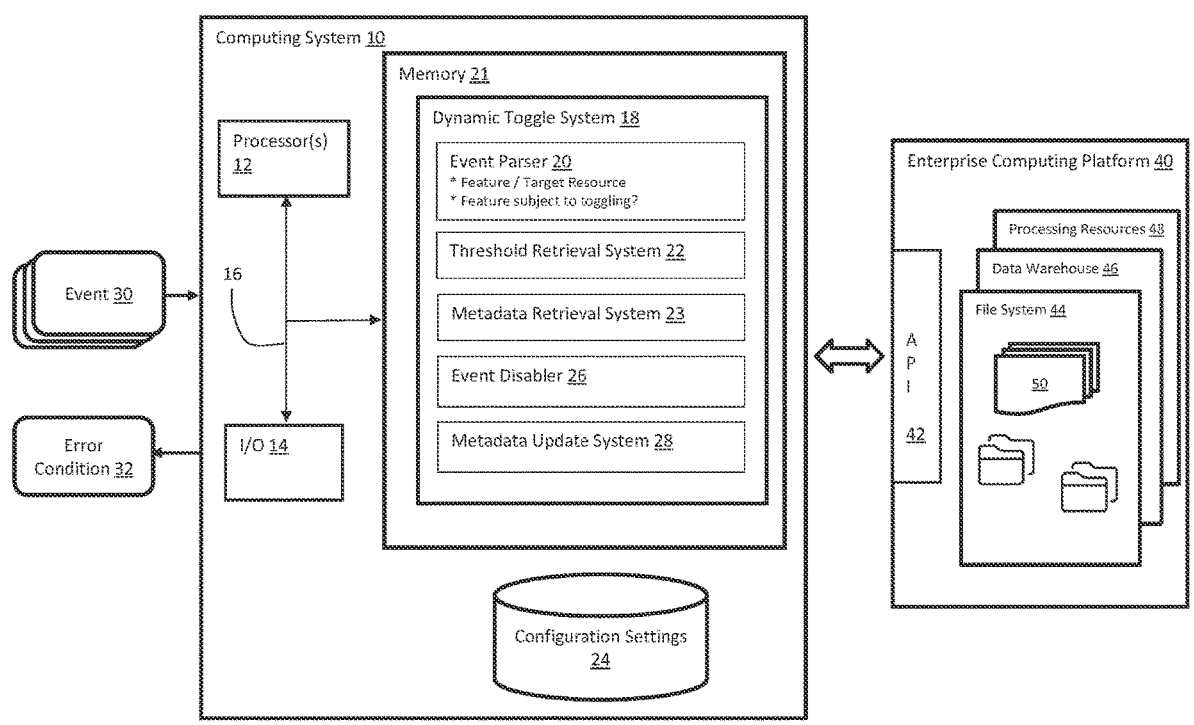
FIG. 2 depicts a computing infrastructure having a dynamic toggle system, in accordance with an illustrative embodiment.

FIG. 2 depicts a computing system 10 having a dynamic toggle system 18 for evaluating events 30, e.g., from an event pipeline being submitted to an enterprise computing platform 40. Enterprise computing platform 40 may comprise any type of cloud, server, virtual workspace system, etc., capable of sharing and provisioning resources to clients and the like. As noted, events generally specify a feature to be performed on an enterprise resource. In the example shown, enterprise resources might include files and folders in a file system 44, databases in a data warehouse 46, CPU cycles from a set of processing resources 48, etc. Features might also include a set of discrete microservices 50 designed to process files and folders, scripts designed to generate database reports, execution of applications designed to run a CPU, etc.

In the depicted embodiment, dynamic toggling system 18 includes an event parser 20 that receives a new event 30 and extracts the subject feature (e.g., move folder) and enterprise resource (e.g., folder: R&D). Extraction of information from the event 30 may be done with a simple software routine that analyzes tags in a data packet containing the event 30. Event parser 20 may also determine if the feature is subject to toggling, e.g., by comparing the extracted feature with listed features in the configuration settings 24, in order to ensure that only potentially problematic features are further processed by dynamic toggling system 18. Once a feature subject to toggling is identified, threshold retrieval system 22 retrieves a processing threshold for the feature from stored configuration settings 24. In the case where the feature involves processing a folder, the processing threshold may specify a number of permissible files, a size, etc. In the case where the feature involves generating a report from a database, the processing threshold may for example include a permissible database record limit or size, a number of permissible query parameters, a permissible time of day for generating the report, etc., or any combination thereof. Configuration settings 24 may be determined in any manner, e.g., based on trial and error, expert knowledge, programmatically via a set of rules, by a machine learning tool, etc.

In this illustrative embodiment, metadata retrieval system 23 obtains metadata associated with the enterprise resource from the enterprise platform 40 via an enterprise application programming interface (API) 42. As noted, metadata includes at least one parameter that indicates a current attribute of the enterprise resource, e.g., number of files in a folder, number of records in a database, processing capabilities of a CPU, amount of storage in a drive, etc. Event disabler 26 is configured to cause the event to not be processed if, e.g., the current attribute of the enterprise resource is greater than the processing threshold for the feature. For example, an event will not be processed if the number of files in a folder exceeds the threshold for a move operation, the number of records in a database exceeds the threshold for a report generation, the available enterprise CPU capabilities are less than a threshold required for running a given application, etc. In such cases, an error condition 32 may also be returned to the client. Additionally, metadata update system 28 may be deployed to update the metadata associated with the enterprise resource to, e.g., indicate that a given feature is or is not currently enabled (e.g., "folder move feature not enabled").

Figure 3:
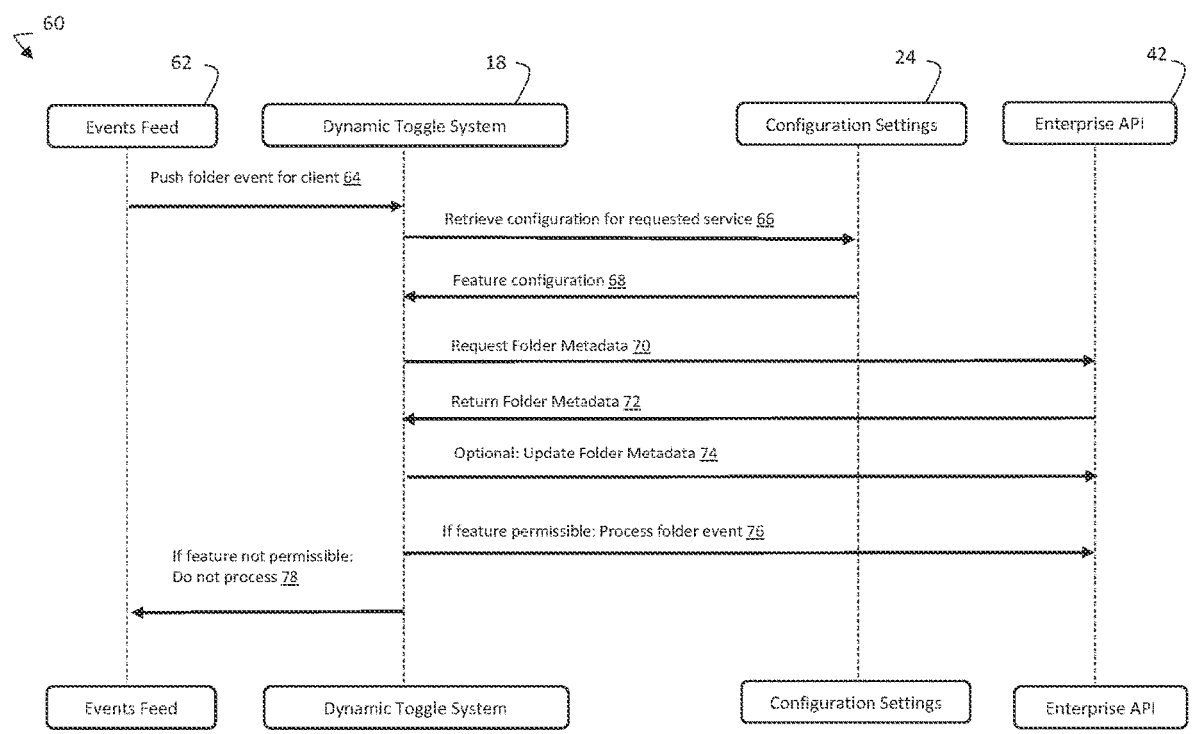
FIG. 3 depicts a sequence diagram for processing folder events, in accordance with an illustrative embodiment.

FIG. 3 depicts an illustrative sequence diagram 60 for processing a folder in an enterprise content collaboration platform. Initially, the folder event is pushed 64 from the events feed 62 to the dynamic toggle system 18. Next, the configuration (i.e., processing threshold) is retrieved 66 from the configuration settings 24 and returned 68 to the system 18. Metadata for the folder is requested 70 by the system 18 from the enterprise API 42 and returned 72 to the system 18. At this point the system 18 compares an attribute of the folder (obtained from the metadata) with a processing threshold (obtained from the configuration settings 24) to determine whether the folder event should be processed. Either at this point or later, the folder metadata can also be optionally updated 74 with the result of the determination. If the feature is deemed permissible by the system 18, the folder event is processed 76. Otherwise the event is not processed 78.

Figure 4:
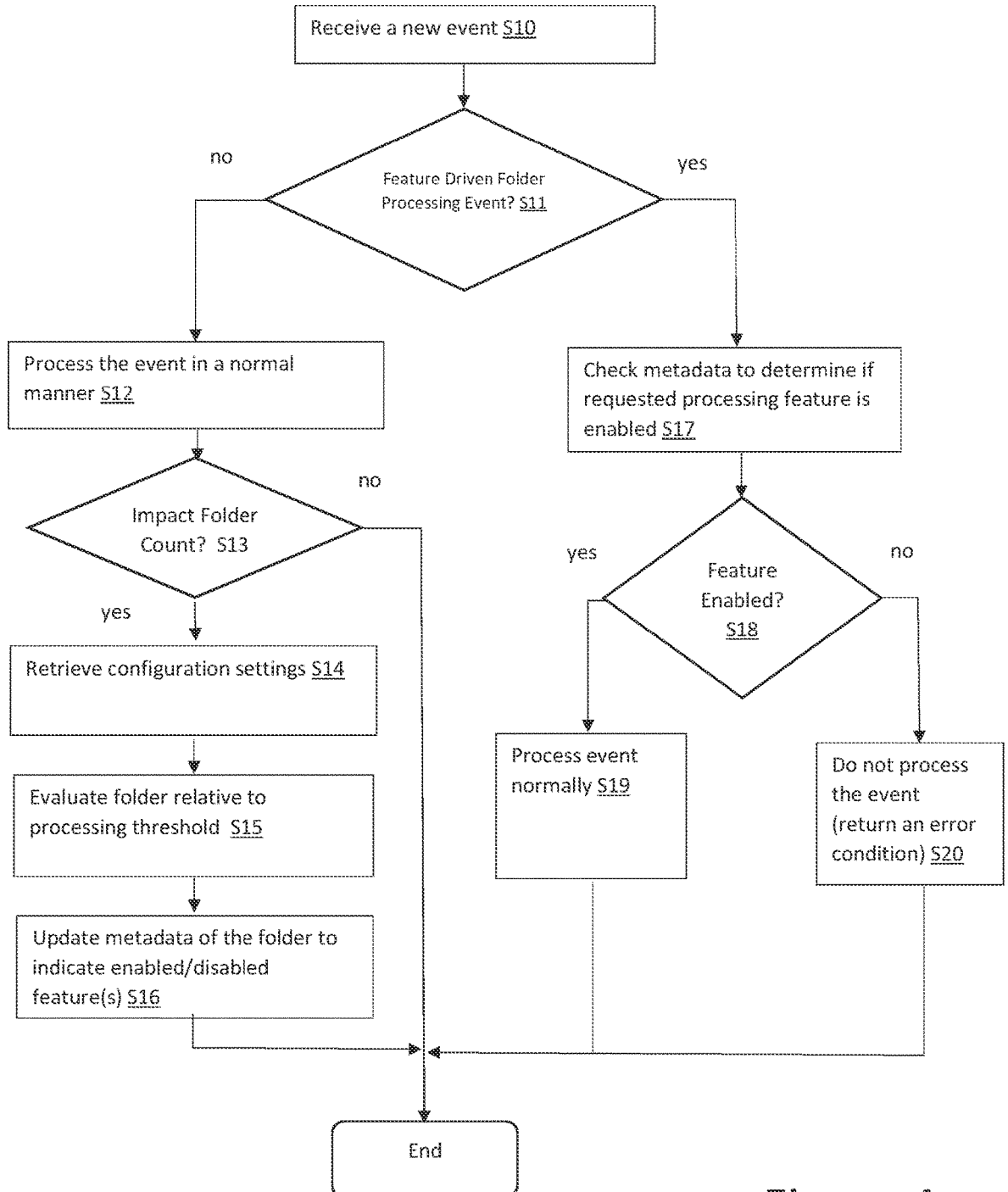
FIG. 4 depicts a flow diagram of an alternative methodology for processing events in an enterprise computing platform, in accordance with an illustrative embodiment.

FIG. 4 depicts a flow diagram of a further illustrative embodiment for processing folder events in an enterprise content collaboration platform. In this embodiment, a new event is received at S10 and at S11 a determination is made whether the event is a feature driven folder processing event. A feature driven folder processing event may include any event in which the entire (or substantial portion of the) contents of a specified folder are processed, e.g., move folder, copy folder, search folder, migrate folder, etc. If the event is not a feature driven folder processing event (no at S11), then the event is processed in a normal manner at S12. Typical events that are not folder processing events include, e.g., a file upload, a file download, a file move, a new file creation, a folder rename, etc. After the event is processed at S12, a determination is made at S13 whether the event impacted a file count within a folder (e.g., increased or decreased the number of files in a folder). If no at S13, the process ends. If yes at S13, then the configuration settings are retrieved at S14 (i.e., processing thresholds for different folder processing features) and the associated folder is evaluated relative to the processing thresholds at S15 to determine which folder processing features should be enabled (or disabled), i.e., permitted (or not permitted) to be executed in the future for the folder. At S16, the metadata associated with the folder is updated to reflect which folder processing features are enabled and/or disabled and the process ends. For example, a folder move feature might be indicated as disabled while a folder search feature might be indicated as enabled.

If the event is determined to be a feature driven folder processing event at S11, then the metadata associated with the folder is checked to determine if the requested folder processing feature is enabled at S17. If the feature is enabled (yes at S18), then the event is processed normally at S19. Otherwise, if the feature is not enabled (no at S18), then the event is not processed and e.g., an error condition is returned at S20.

Figure 5:
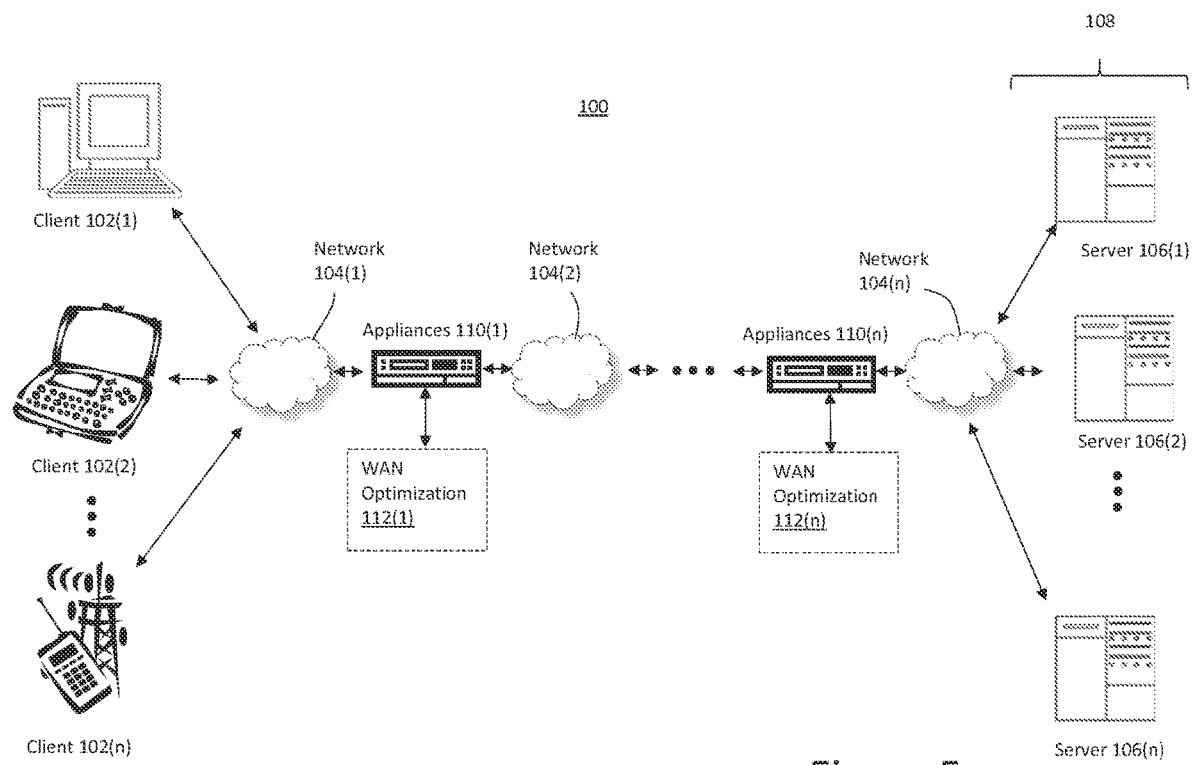
FIG. 5 depicts a network architecture, in accordance with an illustrative embodiment.

Referring to FIG. 5, an illustrative network environment 100 is depicted suitable for implementing an enterprise computing platform. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 110(1)-110n (generally referred to as appliance(s) 110 or gateway(s) 110).

Although the embodiment shown in FIG. 5 shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 5, one or more appliances 110 may be located at various points or in various communication paths of network environment 100. For example, appliance 110(1) may be deployed between two networks 104(1) and 104(2), and appliances 110 may communicate with one another to work in conjunction to, for example, accelerate network traffic between clients 102 and servers 106. In other embodiments, the appliance 110 may be located on a network 104. For example, appliance 110 may be implemented as part of one of clients 102 and/or servers 106. In an embodiment, appliance 110 may be implemented as a network device such as Citrix networking (formerly NetScaler®) products sold by Citrix Systems, Inc. of Fort Lauderdale, Fla.

As shown in FIG. 5, one or more servers 106 may operate as a server farm 108. Servers 106 of server farm 108 may be logically grouped, and may either be geographically co-located (e.g., on premises) or geographically dispersed (e.g., cloud based) from clients 102 and/or other servers 106. In an embodiment, server farm 108 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 5, in some embodiments, appliances 110 may include, be replaced by, or be in communication with, one or more additional appliances, such as WAN optimization appliances 112(1)-112(n), referred to generally as WAN optimization appliance(s) 112. For example, WAN optimization appliance 112 may accelerate, cache, compress or otherwise optimize or improve performance, operation, flow control, or quality of feature of network traffic, such as traffic to and/or from a WAN connection, such as optimizing Wide Area File Features (WAFS), accelerating Server Message Block (SMB) or Common Internet File System (CIFS). In some embodiments, appliance(s) 112 may be a performance enhancing proxy or a WAN optimization controller. In one embodiment, appliance 112 may be implemented as Citrix SD-WAN products sold by Citrix Systems, Inc. of Fort Lauderdale, Fla.

In described embodiments, clients 102, servers 106, and appliances 110 and 112 may be deployed as and/or executed on any type and form of computing device, such as any desktop computer, laptop computer, or mobile device capable of communication over at least one network and performing the operations described herein. For example, clients 102, servers 106 and/or appliances 110 and 112 may each correspond to one computer, a plurality of computers, or a network of distributed computers such as computing system 10 shown in FIG. 2.

Figure 6:
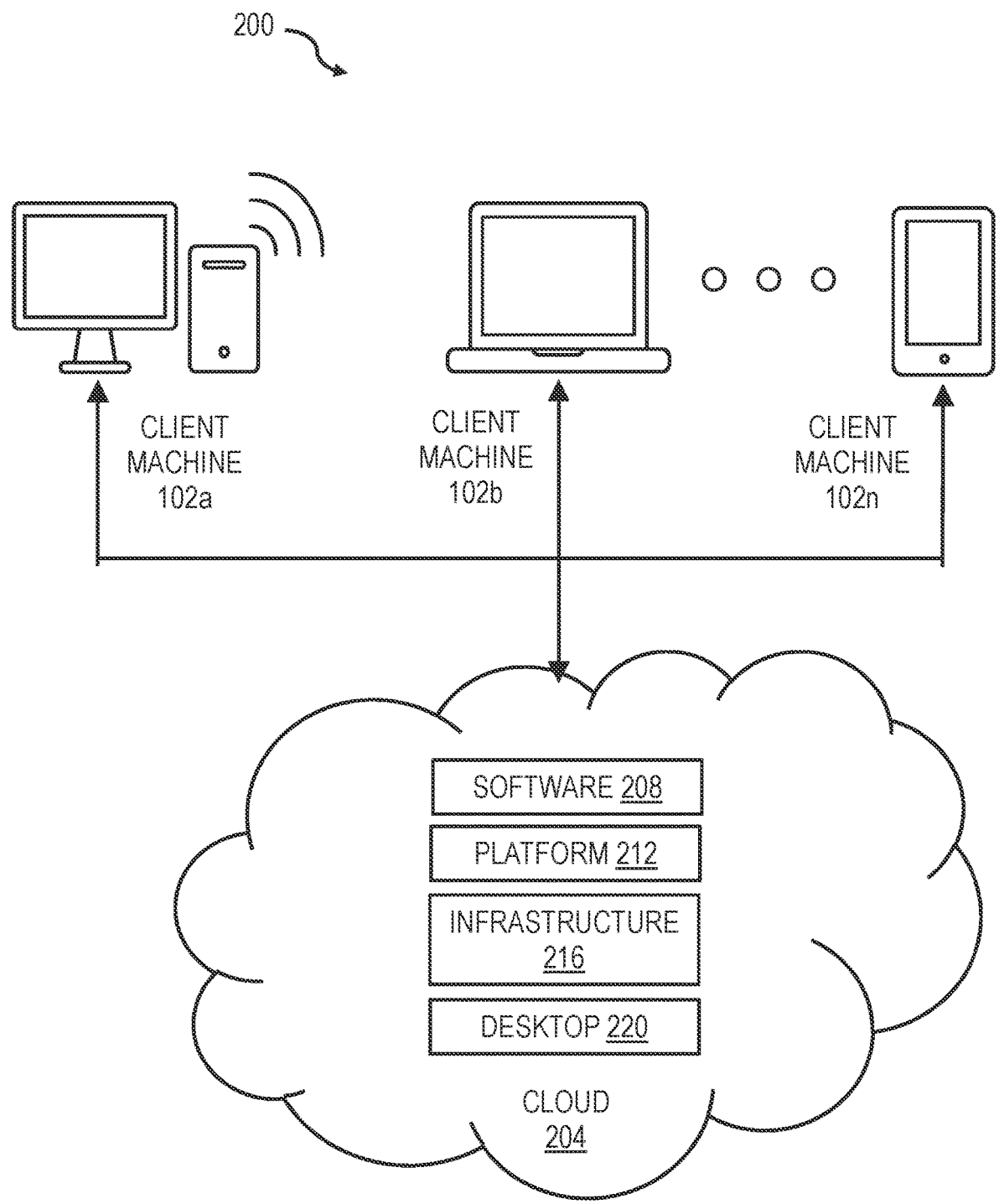
FIG. 6 depicts a cloud system, in accordance with an illustrative embodiment.

Referring to FIG. 6, a cloud computing environment 200 is depicted, which may also be referred to as a cloud environment, cloud computing or cloud network. The cloud computing environment 200 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 200, one or more clients 102a-102n (such as those described above) are in communication with a cloud network 204. The cloud network 304 may include back-end platforms, e.g., servers, storage, server farms or data centers. The users or clients 102a-102n can correspond to a single organization/tenant or multiple organizations/tenants. More particularly, in one example implementation the cloud computing environment 200 may provide a private cloud serving a single organization (e.g., enterprise cloud). In another example, the cloud computing environment 200 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 200 may provide a hybrid cloud that is a combination of a public cloud and a private cloud. Public clouds may include public servers that are maintained by third parties to the clients 102a-102n or the enterprise/tenant. The servers may be located off-site in remote geographical locations or otherwise.

The cloud computing environment 200 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 200 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 200 can provide an elasticity to dynamically scale out or scale in response to different demands from one or more clients 102. In some embodiments, the cloud computing environment 200 can include or provide monitoring services to monitor, control and/or generate reports corresponding to the provided shared services and resources.

In some embodiments, the cloud computing environment 200 may provide cloud-based delivery of different types of cloud computing services, such as Software as a service (SaaS) 208, Platform as a Service (PaaS) 212, Infrastructure as a Service (IaaS) 216, and Desktop as a Service (DaaS) 220, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Computing system 10 (FIG. 2) may for example be implemented by a cloud computing environment that employs a network of remote, hosted servers to manage, store and/or process data, and may generally be referred to, or fall under the umbrella of, a "network service." The cloud computing environment may include a network of interconnected nodes, and provide a number of services, for example hosting deployment of customer-provided software, hosting deployment of provider-supported software, and/or providing infrastructure. In general, cloud computing environments are typically owned and operated by a third-party organization providing cloud services (e.g., Amazon Web Services, Microsoft Azure, etc.), while on-premises computing environments are typically owned and operated by the organization that is using the computing environment. Cloud computing environments may have a variety of deployment types. For example, a cloud computing environment may be a public cloud where the cloud infrastructure is made available to the general public or particular sub-group. Alternatively, a cloud computing environment may be a private cloud where the cloud infrastructure is operated solely for a single customer or organization or for a limited community of organizations having shared concerns (e.g., security and/or compliance limitations, policy, and/or mission). A cloud computing environment may also be implemented as a combination of two or more cloud environments, at least one being a private cloud environment and at least one being a public cloud environment. Further, the various cloud computing environment deployment types may be combined with one or more on-premises computing environments in a hybrid configuration.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Computing system 10 (FIG. 2) may comprise any type of computing device that for example includes at least one processor 12, memory, an input/output (I/O) 14, e.g., one or more I/O interfaces and/or devices, and a communications pathway or bus 16. In general, the processor(s) execute program code which is at least partially fixed in memory. While executing program code, the processor(s) can process data, which can result in reading and/or writing transformed data from/to memory and/or I/O for further processing. The pathway provides a communications link between each of the components in the computing device. I/O can comprise one or more human I/O devices, which enable a user to interact with the computing device and the computing device may also be implemented in a distributed manner such that different components reside in different physical locations.

Memory 21 may comprise volatile memory (e.g., RAM) and/or non-volatile memory e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof, etc. I/O 14 may include a user interface, a graphical user interface (GUI) (e.g., a touchscreen, a display, etc.) and one or more input/output (I/O) devices (e.g., a mouse, a keyboard, etc.). Computing system 10 typically may also include an operating system, additional applications, data, peripherals, etc. Computing system 10 is shown merely as an example, as clients, servers and/or appliances and may be implemented by any computing or processing environment and with any type of machine or set of machines that may have suitable hardware and/or software capable of operating as described herein.

Processor(s) 12 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

In described embodiments, a first computing device may execute an application on behalf of a user of a client computing device, may execute a virtual machine, which provides an execution session within which applications execute on behalf of a user or a client computing device, such as a hosted desktop session, may execute a terminal services session to provide a hosted desktop environment, or may provide access to a computing environment including one or more of: one or more applications, one or more desktop applications, and one or more desktop sessions in which one or more applications may execute.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for processing events for a content collaboration platform, comprising:
    determining, by a computing device, whether a received event includes a feature driven folder processing event;
    in response to a determination that the event is not a feature driven folder processing event, using the computing device to process the event and determine whether a file count for a folder is impacted;
    in response to the file count being impacted, using the computing device to evaluate the file count relative to a set of processing thresholds to determine which feature driven folder processing events are enabled for the folder, and to update associated metadata for the folder; and
    in response to a determination that the event is a feature driven folder processing event, using the computing device to check the metadata for an associated folder to determine whether a requested feature is enabled.

2. The method of claim 1, wherein in response to a determination that the requested feature is not enabled, preventing processing of the requested event.

3. The method of claim 1, wherein in response to a determination that the requested feature is enabled, processing of the requested event.

4. The method of claim 1, wherein the feature driven folder processing event is selected from a group consisting of: a move operation, a copy operation, and a search operation.

5. The method of claim 1, wherein the metadata associated with the folder dictates which features are enabled.

6. The method of claim 1, wherein the content collaboration platform is implemented by an enterprise computing platform that processes events from an event pipeline.

7. The method of claim 6, wherein the enterprise computing platform includes an application programming interface (API) for receiving events.

8. The method of claim 1, wherein determining whether a file count for a folder is impacted includes determining whether a number of files in the folder increased or decreased.

9. The method of claim 1, wherein the configuration settings include a threshold value for each feature driven folder processing event.

10. The method of claim 1, wherein feature driven folder processing events do not include at least one of: a file upload, a file download, a file move, a new file creation, or a folder rename.

11. A computing system, comprising:
    a memory; and
    a processor configured to process events for a content collaboration platform, including:
        determining whether a received event includes a feature driven folder processing event;

in response to a determination that the event is not a feature driven folder processing event, processing the event and determining whether a file count for a folder is impacted;

in response to the file count being impacted, evaluating the file count relative to a set of processing thresholds to determine which feature driven folder processing events are enabled for the folder, and to update associated metadata for the folder; and in response to a determination that the event is a feature driven folder processing event, using the computing device to check the metadata for an associated folder to determine whether a requested feature is enabled.

12. The computing system of claim 11, wherein in response to a determination that the requested feature is not enabled, preventing processing of the requested event.

13. The computing system of claim 11, wherein in response to a determination that the requested feature is enabled, processing of the requested event.

14. The computing system of claim 11, wherein the feature driven folder processing event is selected from a group consisting of: a move operation, a copy operation, and a search operation.

15. The computing system of claim 11, wherein the metadata associated with the folder dictates which features are enabled for the folder.

16. The computing system of claim 11, wherein the content collaboration platform is implemented by an enterprise computing platform that processes events from an event pipeline.

17. The computing system of claim 16, wherein the enterprise computing platform includes an application programming interface (API) for receiving events.

18. The computing system of claim 11, wherein determining whether a file count for a folder is impacted includes determining whether a number of files in the folder increased or decreased.

19. The computing system of claim 11, wherein the configuration settings include a threshold value for each feature driven folder processing event.

20. The computing system of claim 11, wherein feature driven folder processing events do not include at least one of: a file upload, a file download, a file move, a new file creation, or a folder rename.

* * * * *